United States Patent [19]

Gruett

[11] 4,034,831

[45] July 12, 1977

[54] OILER ASSEMBLY

[75] Inventor: Donald G. Gruett, Manitowoc, Wis.

[73] Assignee: Oil-Rite Corporation, Manitowoc, Wis.

[21] Appl. No.: 339,230

[22] Filed: Mar. 8, 1973

[51] Int. Cl.$^2$ .................................... F01M 9/06
[52] U.S. Cl. .................... 184/81; 184/64; 184/103 R
[58] Field of Search .............. 184/64, 81, 103 R; 308/87, 111, 125; 165/183

[56] References Cited

U.S. PATENT DOCUMENTS

| 105,750 | 7/1870 | Wickersham | 184/64 |
| 827,283 | 7/1906 | Anderson | 184/64 |
| 1,759,254 | 5/1930 | Gits | 184/64 |
| 2,672,951 | 3/1954 | Bogert | 184/103 R X |
| 3,358,750 | 12/1967 | Thomas | 165/183 X |
| 3,590,857 | 7/1971 | Gruett | 84/103 R X |
| 3,650,355 | 3/1972 | Boswell | 184/64 X |
| 3,738,453 | 6/1973 | Boswell | 184/64 |

Primary Examiner—Ronald H. Lazarus
Attorney, Agent, or Firm—Andrus, Sceales, Starke & Sawall

[57] ABSTRACT

There is disclosed an oiler assembly for lubricating at least one lubrication point capable of drawing and maintaining a vacuum. The assembly includes a source of supply of oil lubricant and feed units corresponding in number to the lubrication points and connected to the common supply. The feed units have a suction outlet and include a standpipe communicating with the supply of oil lubricant. The feed units further include a sump separated from the corresponding standpipes by a common wall. At least one wire or rod element extends over the common wall and delivers oil lubricant from the standpipe to the sump. The feed units also include passage means placing the suction outlet in communication with the sump with a portion of the passage means being disposed higher than the common wall. The oil lubricant feed rate is adjustable by the removal or addition of wire or rod elements between the standpipe and sump.

8 Claims, 5 Drawing Figures

OILER ASSEMBLY

BACKGROUND OF THE INVENTION

This invention relates to an oiler assembly and more specifically to such an assembly for lubricating at least one lubrication point capable of drawing and maintaining a vacuum.

When a given machine has a plurality of lubrication points capable of drawing and maintaining a vacuum, each such lubrication point heretofore required an oiler assembly. To equip a machine with a number of such assemblies is costly and presents a cluttered appearance. It is also time consuming to replenish the oil lubricant in all the assemblies and the attendant spillage hazard is substantial. The feed rate adjustment on such assemblies was at best not convenient. It is generally an object of this invention to provide an oiler assembly which is capable of feeding one or more lubrication points and wherein the feed rate of a given feeder unit is easily adjusted and without otherwise disturbing the assembly.

SUMMARY OF THE INVENTION

Broadly the invention is directed to an oiler assembly for lubricating at least one lubrication point capable of drawing and maintaining a vacuum. The assembly includes a source of oil lubricant and at least one oil lubricant feed unit having a suction outlet. The feed unit includes a standpipe connected to the source of oil lubricant. The feed unit further includes a sump separated from the standpipe by a common wall. At least one wire or rod element extends over or is clipped onto the common wall between the standpipe and the sump to carry the oil lubricant from the standpipe into the sump. The feed unit also includes passage means for placing the suction outlet in communication with the sump with a portion of the passage means being disposed higher than the common wall between the standpipe and the sump.

DESCRIPTION OF THE DRAWING FIGURES

The drawing furnished herewith illustrate the best mode presently contemplated for carrying out the invention and are described hereinafter.

DESCRIPTION OF THE ILLUSTRATED EMBODIMENTS

Figure 3:
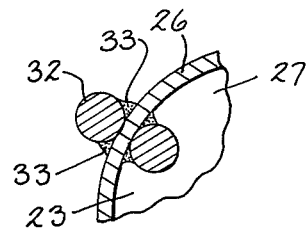
FIG. 3 is an enlarged detail section through the common wall separating the standpipe and the sump of a feeder unit and shows corresponding portions of a wire or rod element.

Referring to the drawings, the oiler assembly 1 of this invention includes an oil supply 2 and at least one satelite feed valve oiler unit 3 communicating with the oil supply through a hollow connector 4.

The oil supply 2 includes the transparent reservoir 5 having an externally threaded neck 6 which terminates with the mouth 7. The mouth 7 is closed by the cover assembly 8 including the cover 9 which is threadedly engaged over the neck 6. In service, the reservoir 5 is oriented to place the mouth 7 downwardly to provide for the feeding of an oil lubricant into the base fitting receptacle 10.

A tubular nozzle 11 projects from the reservoir 5 and forms a part of the cover assembly 8. The nozzle 11 is threaded through an opening in the cover 9 to engage an annular flange 12 on the nozzle with the outer face of the cover. The end of nozzle 11 within the reservoir 5 forms an annular valve seat at 13 selectively engageable by the conical check valve member 14 to close the reservoir entrance to the nozzle. Check valve member 14 is provided with a long stem 15 which extends downwardly through the nozzle 11 and projects therefrom. Movement of the valve member 14 away from the seat at 13 is confined by the cap nut 16 which threads onto the end of the nozzle 11 inside the reservoir 5 to secure the nozzle relative to the cover 9. Oil lubricant in the reservoir 5 gains access to the nozzle 11 through a central opening 17 in the cap nut 16 as well as through a plurality of side openings 18 in the nut.

In service the reservoir 5 is mounted on the base fitting receptacle 10 by a threaded engagement between an intermediate portion of the nozzle 11 adjacent to the flange 12 and an internal threaded portion within the upper end of the receptacle. The engagement contemplates a seating of the flange 12 on the upper end of the receptacle 10 so that the nozzle 11 will project a given distance into the receptacle and the valve stem 15 will rest on the bottom of the receptacle to maintain the valve member 14 off of the seat at 13 and provide for the feeding of oil lubricant from the reservoir 5 into the receptacle as required. Assuming the presence of an oil lubricant in reservoir 5, a generally constant level of oil lubricant will be maintained in the receptacle 10 to a depth determined by the one or more recesses 19 in the end of the nozzle 11 projecting into the receptacle. The receptacle 10 is provided with a vent opening 20 above the level of the oil lubricant therein to preclude formation of a vacuum within the receptacle.

The check valve 14 selectively closes the tubular nozzle 11 to prevent flow of oil lubricant from the reservoir 5 when the reservoir is oriented with the nozzle extending downwardly and disengaged from the receptacle 10. Thus, the valve member 14 can be relied upon to prevent undue spillage when the reservoir 5 is removed from the receptacle and when the reservoir is being reengaged with the receptacle.

Figure 1:
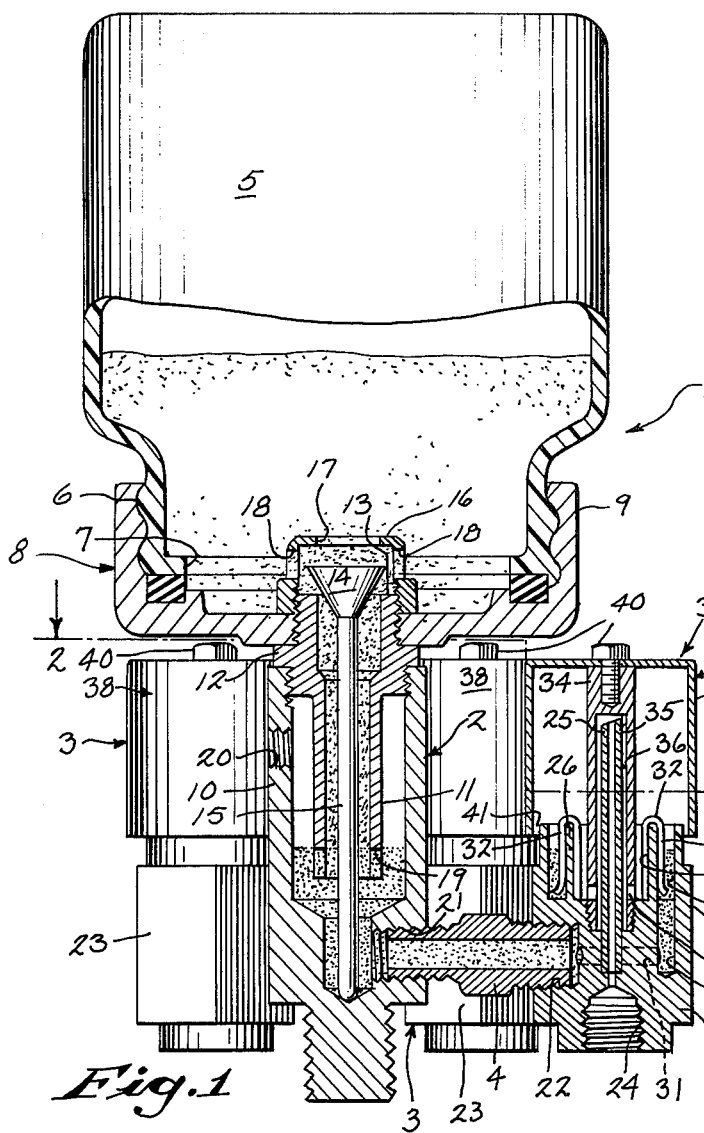
FIG. 1 is a side elevation partially in section showing the oiler assembly of this invention.
Figure 2:
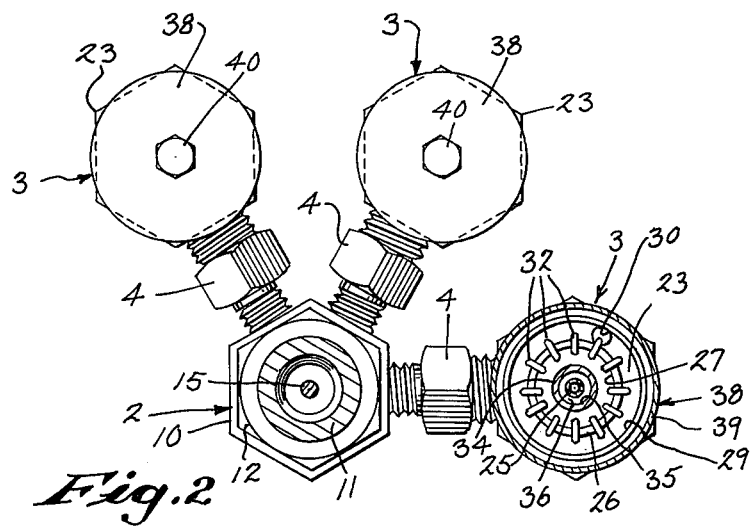
FIG. 2 is a section view taken generally on line 2—2 of FIG. 1.

As shown in FIGS. 1 and 2, three feed valve oiler units 3 are supported in circumferentially spaced relation from the base receptacle 10 by the generally horizontal hollow connectors 4. One end of the connectors 4 engages within corresponding threaded side openings 21 provided in the base receptacle 10 beneath the level of the oil lubricant so that the lubricant is fed from the receptacle to the oiler units 3 as required. The opposite end of the hollow connectors 4 engage within corresponding threaded side openings 22 in the base portion 23 of the oiler units 3.

The feed valve oiler units 3 have a suction outlet 24 which opens downwardly generally centrally of the base portion 23 for connection to a tubular conduit, not shown, for carrying the oil lubricant to a lubrication point capable of drawing and maintaining a vacuum. The suction outlet 24 is an open communication with the tubular member 25 which extends axially in relation thereto and projects upwardly from the base portion 23. An upstanding circular wall 26 is spaced radially outwardly from the tubular member 25 and is formed integrally with the base member 23. The wall 26 forms an annular sump 27 about the tubular member 25 on the base member 23.

A second circular wall 28 formed integrally with the base member 23 is disposed concentrically outwardly of the wall 26 to provide an annular standpipe 29. The annular standpipe 29 communicates with the connector opening 22 and hence with the receptacle 10 through the intercepting passages 30 and 31 in the base member 23. With the standpipe 29 in open communication with the receptacle 10, oil lubricant is maintained in the standpipe to a level corresponding to the generally constant level maintained in the receptacle.

Oil lubricant from the standpipe 29 is fed to the sump 27 by one or more U-shaped wire or rod elements 32 which extend over or clip onto and into intimate contact with the wall 26 separating the standpipe from the sump. The number of wire wicks 32 employed depends on the flow rate of lubricant desired, with twelve wire wicks being shown in FIG. 2. Oil lubricant from the standpipe 29 is fed to the sump 27 by capillary or wick-like action with the oil in the standpipe moving upwardly along the opposed acute angle or wedge-shaped grooves formed between each wire-element 32 and the adjacent wall 26 as generally indicated at 33 in FIG. 3.

The satelite oiler units 3 further include a cover mounting post 34 which is recessed centrally to provide a bore 35 for receiving the tubular member 25. The post 34 extends downwardly through the sump 27 and threadedly engages the base member 23 for securement. The bore 35 terminates in spaced relation above tubular member 25 and the wall of bore 35 is spaced radially from the member 25 to provide an annular passage 36 therebetween which communicates with the bore of the tubular member and hence with suction outlet 24. A plurality of openings 37 in the mounting post 34 adjacent to the bottom of sump 27 place the sump in communication with the passage 36. A cover 38 having a downwardly extending cylindrical skirt 39 is secured onto the post 34 by the machine screw 40. The skirt 39 of cover 38 vertically overlaps with the outer wall 28 and is spaced outwardly therefrom to provide the oiler unit 3 with an annular vent passage 41 to preclude formation of a vacuum in the oiler unit above the base portion 23.

The oiler assembly 1 is adapted to supply or feed small quantities of an oil lubricant to a lubrication point through a line, not shown, connected to the suction outlet 24 of an oiler unit 3. The suction or vacuum set up at the lubrication point gives rise to a pressure differential between the lubrication point and the oiler unit 3 so that oil lubricant delivered to the sump 27 by the wire 32 will be carried by the flowing air through the openings 37, passage 36, and tubular member 25 of the oiler unit 3 to the lubrication point.

Depending on the number of wires 32 employed, feed rates contemplated for an oiler unit 3 will generally range between several drops of oil lubricant per minute to one drop every six minutes when using an SAE 20 oil. The adjustment of feed rate is readily accomplished by removal or addition of wires 32 and can be done without otherwise disturbing the installation. The wires 32 are self-cleaning and, therefore, never need replacement.

When a lubrication point ceases to draw a vacuum upon shut-down of the corresponding machine, oiler unit 3 will stop feeding oil to the lubrication point for lack of a necessary pressure differential. Thus, operation of the oiler unit 3 is automatic. Even when oiler unit 3 is not feeding an oil lubricant to the lubrication point during periods of machine shut-down, the oil lubricant will accumulate in the sump 27 as the wires 32 continue to supply lubricant from the standpipe 29 by capillary action which will continue to do so until the sump is filled. Thus, the sump during periods of machine shut-down will be collecting a reserve of lubricant available for machine startup.

The oiler 1 can be adapted to serve multiple lubrication points by connecting a corresponding number of satelite feed valve oiler units 3 to the base fitting receptacle 10 as generally shown in FIGS. 1 and 2. The oiler assembly 1 is particularly effective for lubrication of a vacuum pump in which application one oiler unit 3 may be utilized to feed oil lubricant to the pump rotor and two further oiler units 3 supply lubricant to the opposed rotor shaft bearings and the corresponding seals. In an application involving multiple oiler units 3, each unit is of course, individually adjustable to provide the feed rate desired.

Figure 4:
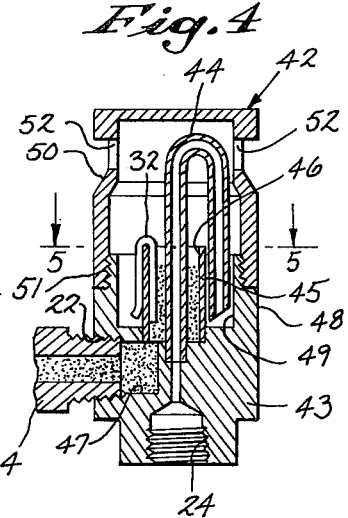
FIG. 4 is an elevation section view showing a further embodiment of the invention.
Figure 5:
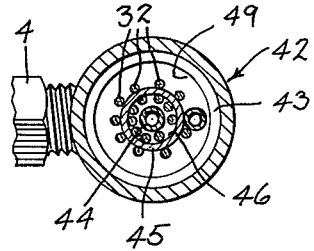
FIG. 5 is a sectional view taken generally on line 5—5 of FIG. 4.

In the embodiment of FIGS. 4 and 5, a feed valve oiler unit 42 is shown which differs somewhat from the oiler unit 3. The oiler unit 42 includes a base portion 43 having a threaded side opening 22 for receiving one end of a hollow connector 4 and a downwardly opening, generally central suction outlet 24 for connection to some lubrication point capable of drawing and maintaining a vacuum generally similar to the corresponding elements in the base portion 23 of oiler unit 3.

The suction outlet 24 of oiler unit 42 is in open communication with the tubular member 44 which projects upwardly about the base portion 43. A wall 45 is spaced from and extends concentrically around the tubular member 44 to form an annular standpipe 46 inside the wall on the base portion 43. An extension passage 47 from side opening 22 of base portion 43 intercepts the base of the standpipe 46 to place the standpipe in communication with the connector 4 and hence with the supply of oil lubricant in the base fitting receptacle 10 which maintains lubricant in the standpipe to a level corresponding to the generally constant level maintained in the receptacle.

An outer wall 48 is spaced from and formed concentrically about the wall 45 on the base portion 43 to provide an annular sump 49 between the walls. One or more U-shaped wires 32 extend over or clip onto the wall 45 separating the standpipe 46 from the sump 49 and serve by capillary action to carry the oil lubricant from the standpipe into the sump. Above the walls 45 and 48 the tubular member 44 is doubled over to take on the general appearance of an inverted U-shaped member with the free end thereof extending into and generally adjacent the bottom of the sump 49.

A cover 50 encloses the standpipe 46 and sump 49 and may be threaded onto the outside stepped portion of the wall 48 as shown at 51. One or more vent openings 52 in the cover 50 preclude the formation of a vacuum in the oiler unit 42 above the base portion 43.

The feed valve oiler unit 42 operates generally similar to the oiler unit 3. A suction or vacuum condition set up at the point of lubrication gives rise to a pressure differential so that the oil lubricant delivered to the sump 49 will be carried by the flowing air into and through the tubular member 44 of the oiler unit 42 to the lubrication point. As in the case of oiler unit 3, the adjustment of lubricant feed rate in oiler unit 42 is accomplished by removal or addition of wires 32. Operation of oiler unit 42, like oiler unit 3, is generally automatic and will stop feeding lubricant when the lubrication point ceases to draw a vacuum upon shutdown of the corresponding machine. The oiler unit 42 may be used in multiples connected to a common base fitting receptacle 10 to service a plurality of lubrication points.

Various modes of carrying out the invention are contemplated as being within the scope of the following claims particularly pointing out and distinctly claiming the subject matter which is regarded as the invention.

I claim:

1. In an oiler assembly, a constant level supply of oil lubricant and at least one oil lubricant feed unit having a suction outlet, said feed unit being spaced laterally from the supply of oil lubricant and comprising a standpipe, hollow connecting means joining the feed unit and the supply and providing for the maintenance of a level of oil lubricant in the standpipe corresponding to the generally constant level maintained at the supply, a sump in the feed unit separated from the standpipe by a common wall, at least one U-shaped bare wire element extending over said common wall and disposed in intimate contact at least with the standpipe side of the wall and the upper edge of the wall to form opposed grooves with said wall whereby to carry oil lubricant from the standpipe into the sump, and passage means placing the suction outlet of the feed unit in communication with said sump with a portion of said passage means being disposed higher than said common wall.

2. The invention as set forth in claim 1 wherein the oiler assembly includes a plurality of oil lubricant feed units and each of the feed units communicates with the constant level supply through corresponding connecting means.

3. In an oiler assembly, a source of oil lubricant and at least one oil lubricant feed unit spaced laterally from said source, said feed unit including a base portion having a suction outlet, passage means communicating with the suction outlet and extending upwardly from the base portion, a pair of spaced, generally circular walls on said base portion disposed concentrically about the passage means and forming a pair of channels with a common wall between said channels, one of said channels comprising a standpipe and having communication with the source of oil lubricant, the other of said channels being a sump, said passage means placing the sump in communication with the suction outlet with a portion of the passage means being disposed higher than said common wall, and a plurality of circumferentially spaced bare wire elements clipped onto the common wall between the standpipe channel and the sump channel, the oil lubricant feed rate of the feed unit being adjustable by removal or addition of wire elements.

4. In an oiler assembly, a source of oil lubricant and at least one oil lubricant feed unit spaced laterally from said source, said feed unit including a base portion having a suction outlet, passage means communicating with the suction outlet and extending upwardly from the base portion, a pair of spaced, generally circular walls on said base portion disposed concentrically about the passage means and forming a pair of channels with a common wall between said channels, the inner of said channels serving as a sump and the outer channel serving as a standpipe, said standpipe channel having communication with the source of oil lubricant, said passage means placing the sump in communication with the suction outlet with a portion of the passage means being disposed higher than said common wall, and at least one generally U-shaped bare wire element clipped onto the common wall to carry oil lubricant from the standpipe channel into the sump channel.

5. The invention as set forth in claim 4 wherein a portion of the passage means comprises a post having a bore, said post being secured to the base portion and extending upwardly through the sump with said bore communicating with the sump, a cover enclosure for said base portion and mounted on the upper end of the post above said common wall, and means for venting the space between the cover enclosure and base portion to preclude the formation of a vacuum therebetween.

6. The invention as set forth in claim 5 wherein the cover enclosure includes a depending skirt which vertically overlaps with and is spaced radially from the outer wall of the base member to provide a circumferential vent between the base portion and its cover enclosure.

7. In an oiler assembly, a source of oil lubricant and at least one oil lubricant feed unit spaced laterally from said source, said feed unit including a base portion having a suction outlet, passage means communicating with the suction outlet and extending upwardly from the base portion, a pair of spaced, generally circular walls on said base portion disposed concentrically about the passage means and forming a pair of channels with a common wall between said channels, the inner of the channels serving as a standpipe and the outer channel serving as a sump, said passage means extending over the common wall and into the sump to place the sump in communication with the suction outlet, said standpipe channel having communication with the source of oil lubricant, and at least one generally U-shaped bare wire element clipped onto the common wall to carry oil lubricant from the standpipe channel into the sump channel.

8. The invention as set forth in claim 7 wherein a cover is provided on the base portion to enclose the standpipe and sump, said cover having vent means to preclude the formation of a vacuum in the feed unit above the standpipe and sump.

* * * * *